H. P. DUNBAR & T. C. LOTHROP.

Rubber Articles.

No. 8,043. Reissued Jan. 22, 1878.

Witnesses.
Louis A. Curtis
Wm. Turell Andrews Jr.

Inventors.
H. P. Dunbar and T. C. Lothrop.
F. Curtis. Atty.

UNITED STATES PATENT OFFICE.

HIRAM P. DUNBAR AND THOMAS C. LOTHROP, OF BOSTON, MASS.

IMPROVEMENT IN RUBBER ARTICLES.

Specification forming part of Letters Patent No. 170,941, dated December 14, 1875; Reissue No. 8,043, dated January 22, 1878; application filed December 26, 1877.

*To all whom it may concern:*

Be it known that we, HIRAM P. DUNBAR and THOMAS C. LOTHROP, of Boston, Suffolk county, State of Massachusetts, have invented an Improved Manufacture of Articles from Vulcanized Rubber, of which the following is a specification:

This invention relates to the manufacture of floor-cloths and numerous other articles of a useful or ornamental nature from vulcanized india-rubber, whereby we are enabled not only to produce figures or designs which shall vary greatly in character or extent with the uses to which they are to be put, but to obtain a product which shall withstand a great amount of wear, owing to its inherent elasticity, and in the end shall be very economical.

Our invention consists in the employment of a base of a cheap vulcanizable compound, forming the body of the floor-cloth or other article, combined with overlaying or inlaying ornamentations or characters, made of a compound of coloring or neutral tint matters, containing sufficient rubber to cause the same to assimilate with the base and be susceptible of vulcanization, the said parts being united by vulcanization.

Figure 1:
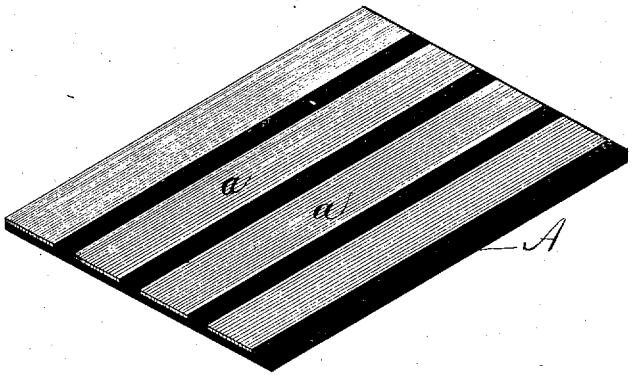
Figure 2:
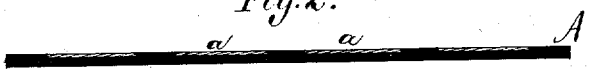

The drawings accompanying this specification represent, in Figure 1, a perspective view, and in Fig. 2 a section, of a floor-cloth embodying our invention, in which the ornamental surfacing is in the form of strips of rubber compound in a solid state.

In carrying our invention into practice in the production of floor-cloths, for instance, which is one of the articles we are manufacturing under our invention, we provide a base or body, A, of a compound of india-rubber and other ingredients—say the packing material of commerce, now in general use for packing steam-joints, &c., which is a comparatively cheap product, and yet very durable in wear; and we, preferably, though not necessarily, add to the material of the base A a very small additional percentage of pure rubber, to insure certain assimilation and union of the outer surfacing or ornamentation, to be hereinafter explained.

To produce the inlaying or overlaying surfacing which gives ornament and relief to the base A, we employ certain ingredients or coloring matters to obtain the desired color or tint, and we add to such coloring matters a sufficient quantity of pure rubber to cause them to assimilate with the rubber in the base, and be susceptible of vulcanization.

The ornamental composition is applied to the surface of the base, so as to produce the desired pattern, as shown at *a a*. When, as in the present instance, the ornamental composition is sufficiently solid, it may be rolled or pressed into the base, so as to be inlaid therein. This, however, will depend upon the consistency of the ornamental composition and its thickness.

The base or body A, (not yet vulcanized,) with its ornamental surfacing, is now subjected to the ordinary vulcanizing process, with the well-known results of such process.

By the hereinbefore-described method—that is, the employment of a base or body of comparatively cheap material, overlaid or inlaid with characters more or less ornamental, which are vulcanized with such base—we are enabled to supply, at low cost, not only a very durable but an ornamental product, and to make available and adapt to many uses in the arts a product which has heretofore been in comparatively small demand, and employed mainly for packing.

A floor-cloth, especially, produced as above described, is very durable, owing to its inherent elasticity, which yields to the impact of objects which rapidly wear out ordinary hard or rigid materials, while we obtain all the desirable effects, as regards ornamental figures and colors, of expensive materials.

In conclusion, we would state that we do not confine ourselves to the form, character, or extent of the outer surfacing or ornamentation which we employ to give effect or relief to the base or body, as this may be varied to a great extent without losing sight of the gist or intent of our invention, which, as before stated, consists in a base or body of a cheap material, inlaid or overlaid with characters composed of suitable coloring matters and pure or fine rubber, and the whole subsequently vulcanized.

Prior to our present invention the only analogous product, so far as our experience of extensive rubber manufacture enables us to be acquainted, has been table and piano covers, &c., which have been composed of a thin sheet of rubber-cloth, first vulcanized, and then ornamented with various designs in ordinary paint, which dries in the ordinary manner, without subsequent vulcanizing. The ornamentations thus produced are only upon the surface, and soon wear off.

By our method of employing a compound of coloring matters and rubber for the ornamentations of the base, and vulcanizing the whole together, we prolong the wear of such ornamentations to an extent that is not possible without passing through the vulcanizing process.

We claim as our invention, and desire to secure by Letters Patent of the United States, the following, to wit:

1. A process or method of producing rubber products, which consists in uniting with a base or body of comparatively low cost, containing a quantity of rubber, an inlaying or overlaying ornamentation of characters of any given material, color, or tint, provided with sufficient pure or fine india-rubber (or caoutchouc) to enable them to assimilate more or less completely with the base, and be susceptible of vulcanization, substantially as and for purposes stated.

2. A product composed of a base or body of cheap material, containing a quantity of rubber, and an overlaying or inlaying ornamentation, the material of which contains sufficient pure rubber to receive vulcanization, substantially as and for purposes stated.

3. A floor-cloth composed of a base or body of cheap material, of which india-rubber is a component part, and an overlaid or inlaid ornamentation, composed of materials to impart the desired colors or neutral tints and a sufficient quantity of rubber to assimilate with the rubber of the base, and be susceptible of vulcanization with the latter, substantially as and for purposes stated.

HIRAM P. DUNBAR.
THOS. C. LOTHROP.

Witnesses:
F. CURTIS,
LOUIS A. CURTIS.